Jan. 1, 1952     J. GUNZ     2,580,764
TWO STAGE FILTRATION OF SEWAGE
Filed Oct. 3, 1947
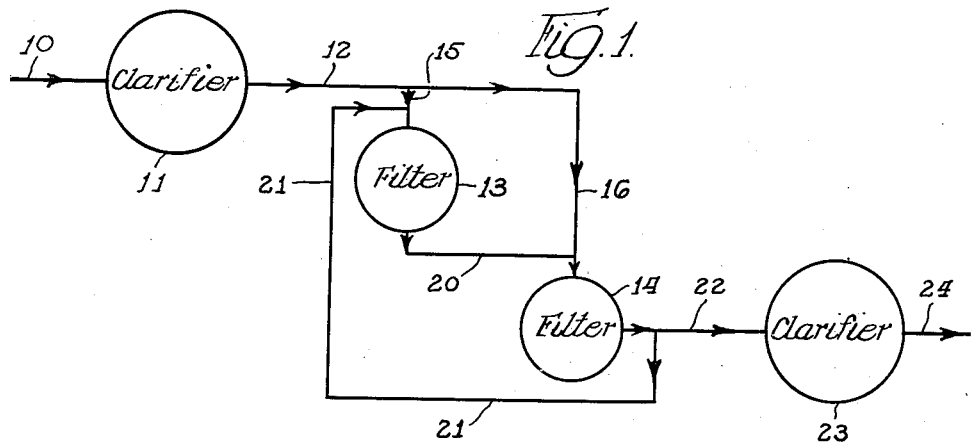
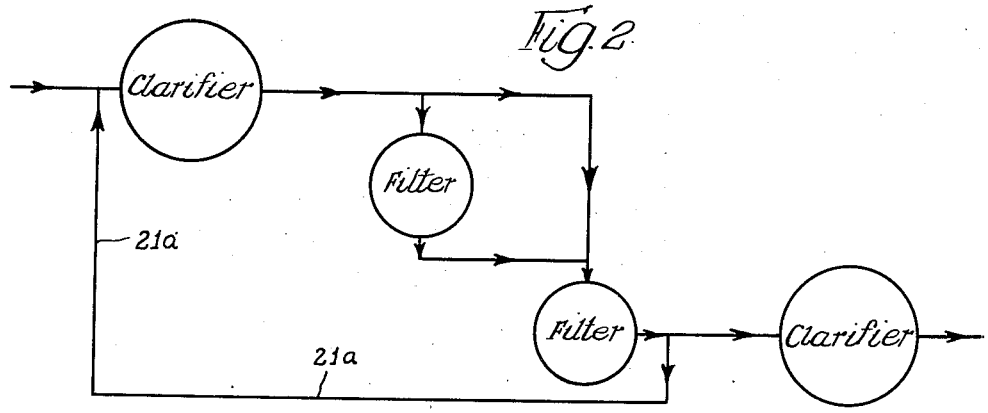
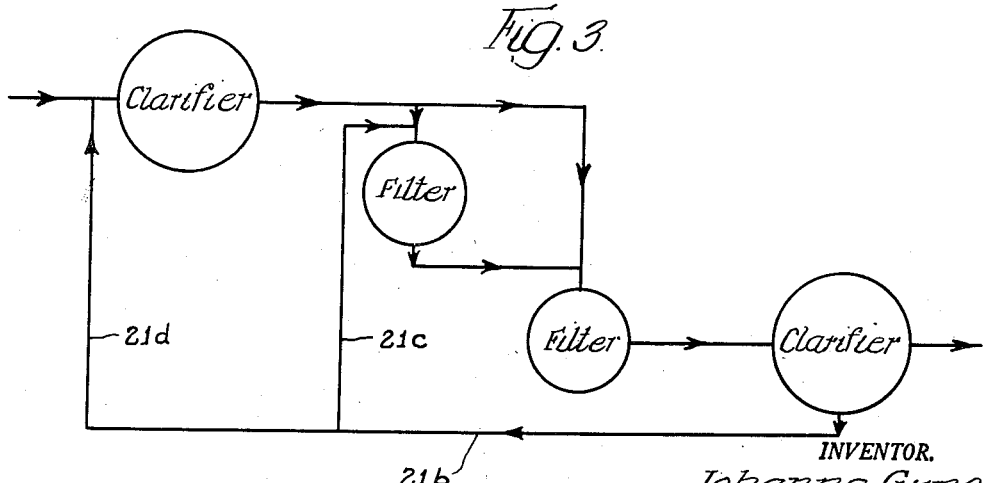
INVENTOR.
Johanna Gunz,
BY Robyn Silvas
ATTY.

Patented Jan. 1, 1952

2,580,764

UNITED STATES PATENT OFFICE 2,580,764

TWO STAGE FILTRATION OF SEWAGE

Johanna Gunz, Tucson, Ariz., assignor to Infilco Incorporated, Chicago, Ill., a corporation of Delaware Application October 3, 1947, Serial No. 777,673

6 Claims. (Cl. 210—7)

This invention relates to the treatment of sewage and the like by filtration through trickling filters.

It is an object of this invention to provide an improved sewage treating system including filtering sewage through a plurality of filters.

Another object of my invention is to provide a trickling filter plant or system wherein the filters are connected in a manner to equalize the organic load on both, and to maintain both at highest efficiency.

Another object of the invention is to provide two stage filtration of sewage with the filters of each stage serving simultaneously as primary and as secondary filters.

Another object is to provide a trickling filter plant combining the advantages of parallel and of stage filtration.

These and other objects of the invention will become apparent upon consideration of the description and claims which follow.

Except in small plants where one filter is sufficient for treating the entire volume of sewage, trickling filter plants are usually laid out either in parallel or in series, or stages, as they are sometimes called. In the first case, the incoming raw sewage, usually after removal of settleable solids in a preliminary treating device, such as a clarifier, is split into several equal portions, each filter being dosed with one portion. Where recirculation is practised in such a system, each filter receives in addition to the raw sewage some of its own effluent for repeated treatment. Each filter thus treats a distinct portion of the incoming sewage, either once or repeatedly, but no portion of the sewage is treated on several filters and the effluent of each filter goes to a final settler which may be common to a group or to all of the filters. Obviously, in such a system of filters operating in parallel, the work to be done is split into equal portions, each filter doing the same amount and kind of work, but no interaction or cooperation of the filters exists otherwise.

It is generally maintained that where a high grade of purification is required, this can be accomplished more economically by filtering the sewage in sequence through filters of two stages rather than by filtration in parallel. Two stage filtration, with or without recirculation, has become a widely accepted practice. In such a system, the filter of the first stage is dosed with the raw sewage. The effluent of the primary filter is passed, with or without intermediate settling, over the secondary filter. The effluent of the secondary filter is passed to a final clarifier or the like. Where recirculation of filter effluent is practised, the first filter in such a two stage system may also be dosed, in addition to the raw sewage, with some portion of its own effluent, or of the secondary effluent, or a mixture of both. Similarly, the secondary filter, beside receiving the effluent of the primary filter, may receive some recycled portion of its own effluent. (Obviously, in large plants there may be four or more filters, and in such plants, when using sequential operation, they are operated in units of two, primary and secondary, with the units operating in parallel. However, for simplification only one set of filters has been mentioned, as the problem to be discussed is the same, whether one or several sets of filters are used.)

Thus, ordinarily, in prior art two stage filtration systems, the secondary filter did not receive raw settled sewage, but only filtered sewage from the primary filter, and sometimes also twice filtered sewage in the form of its own effluent, the raw sewage going only to the primary filter. Obviously, the organic load on the filters of the two stages of such a system is not equal. The purification of raw sewage puts a far heavier load on the primary filter than the further purification of pre-treated sewage on the secondary. The work to be performed by the filters differs not only in quantity but also in quality.

It was recognized in the art that the filters in such a system are not utilized in the best and fullest manner. In order to equalize the organic load on the filters and to enable each of them to work under optimum conditions, it has been suggested to periodically alternate the sequence of dosing the filters. Thus each filter would serve alternately as primary filter and as secondary filter on the theory that in such a system each filter, during the period it serves as secondary filter, can recover from the strain of the organic load put on it during the period it serves as primary filter. The primary filter, which takes the greatest portion of the organic load, will thus periodically be reconditioned without taking it out of operation.

Experience with this system showed that the filters could not readily recover during their period of relative rest as secondary filters, unless they were supplied by the primary filter with a fairly good effluent. In other words, the secondary filter, in order to recover for service as primary, could do very little work and the purification had to be effected to the greatest part by the primary. If the load was too heavy for the primary to give a good effluent the secondary would not recover. Apart from this limitation of the system, a complete reversal of flow at predetermined times, such as is required therefore, is cumbersome and necessitates expensive equipment.

The defects in prior art systems mentioned above can be overcome and the advantages of all of them combined by using the system of my invention. In my system each of the filters functions at all times as a combined primary and secondary filter, and each filter receives raw sewage and also filtered sewage, whereby the organic load is equalized. In this respect the system is similar to, and has the advantages of, parallel filtration. However, in my system the filters are not connected in parallel, but in stages, or sequence. While in parallel filtration each portion of the sewage is treated only on one filter and there is no interaction and cooperation of the filters in treating individual portions of sewage, in my system the sewage is treated by cooperation of the filters of both stages, material from each filter going to the other for further treatment. On the one hand there is a through flow of sewage from a primary clarifier or the like to a first filter, thence to a second filter and thence to a final clarifier or the like. In this respect my system is similar to and has the advantages of a conventional two stage plant. At the same time, however, there is also a flow of raw sewage from the clarifier directly to the secondary filter and a return of material treated on the secondary filter to the first filter. In this manner, the organic load on each filter is about equal, each receiving partly raw sewage and partly material pretreated on the other, thus combining the functions of primary filter and of secondary filter.

My invention will be more readily understood from a consideration of the drawing wherein Figures 1 through 3 show diagrammatically three preferred flow systems embodying my invention.

As shown in Figure 1, raw sewage entering through an inlet 10 is first passed into a clarifier 11 for removing settleable solids prior to its treatment on the trickling filters. In some instances, only a grit chamber or a screen may be needed and the clarifier dispensed with, but ordinarily, and especially in larger plants, a clarifier will precede the biological treatment. The settled raw sewage leaves the clarifier through a conduit 12. The flow is split and one portion is passed into each of the two trickling filters, 13 and 14, respectively, as through conduits 15 and 16. As shown, the effluent from filter 13 (which for convenience may be called the first filter although in my system the two filters do not have the usual characteristics distinguishing "first" and "secondary" filters in conventional two stage filtration) is passed to the other (or second) filter 14 through a conduit 20. The effluent from the second filter is divided, one portion being returned to the inlet of the first filter through a conduit 21 and another portion being discharged through a conduit 22 to a final clarifier 23 whose overflow goes to waste through a conduit 24. Obviously, if desired, each filter may also additionally be dosed with some of its own effluent, as is well known in the art, but this is not essential in my system and in view of the additional piping and pumps needed therefor is less desirable. The several conduits will be provided with the necessary valves and pumps, not shown. It may be mentioned that for simplification, the underflow of the clarifiers is not shown in the drawing, as this can be disposed of in any known conventional manner which forms no part of the invention.

The system as described provides each filter with raw sewage and with sewage that has been treated on the other. Obviously, with equal portions of raw sewage going to both filters, the hydraulic load on the second filter will be greater than on the first, as it receives the same amount of raw sewage and additionally everything that goes through the first filter. The organic load, however, which is commonly expressed in terms of B. O. D. (biochemical oxygen demand) applied, will not be proportionally greater but will be approximately the same on both filters, for the organic load stems mainly from the raw sewage. It is known, and has been proven convincingly by the experiments with alternate double filtration, that a good effluent from a first stage filter does not put a substantial organic load on the secondary filter. The average B. O. D. reduction by a conventional low rate trickling filter is generally assumed to be about 70 percent. For example, Metcalf and Eddy, American Sewerage Practice, Volume 3, state (page 486) that, in general, the reduction in B. O. D. by trickling filters is 60 to 85 percent. The effluent from my first filter is much better than usual first stage filter effluent, as due to the division of the raw sewage between the two filters the load on the first is halved. This lesser amount of raw sewage is diluted with recirculated sewage which—to some extent—has been twice previously filtered.

While I have spoken of equal portions of raw sewage going to both filters, this proportion is not sharply critical. However, to obtain the advantages of my invention, a very substantial portion of the raw sewage should be applied to the secondary filter.

The equalization in the organic load provided by my system as compared with a conventional two stage trickling filter system will be readily seen by considering that in a conventional two stage plant the first filter receives 100 percent of the B. O. D. of the raw sewage, while the second filter, on the basis of 70 percent B. O. D. reduction by the first filter, receives only 30 percent. Taking the same figure of 70 percent B. O. D. reduction for my system and disregarding for the moment the recirculation from the second to the first filter, then, with equal amounts of raw sewage going to the two filters, the first filter of my system receives 50 percent of the B. O. D. (applied to it in the raw sewage), and the second filter receives 50 percent of the B. O. D. (applied to it in the raw sewage), plus 15 percent of the B. O. D. (applied to it in the effluent from the first filter). Thus, without any recirculation from the second to the first filter, there is a difference of only 15 percent in the load applied to the two filters, as compared with a difference of 70 percent in a conventional two stage filter system. When applying the initial B. O. D. of the raw sewage at the rate say of 55 percent to the first filter and 45 percent to the second, instead of the equal amounts of the above example, the difference is only .5 percent. The difference is further reduced by the recirculation. Obviously, any amount of B. O. D. returned from the second to the first filter is reduced thereon, and only a small percentage of this recirculated B. O. D. is passed on to the second filter. When considering these simple arithmetics of my system, it will become apparent that the difference in the organic load on the two filters can be narrowed to any desired degree by varying the quantity of recirculation. It will also be obvious that the amount of recirculation needed to obtain the desired degree of equalization under any set of circumstances can be readily computed.

My system eliminates completely the danger of some portion of untreated sewage being discharged with the effluent. Every portion of sewage entering the system has to be treated at least once before it can leave the system. Some of the raw sewage entering the second filter will be treated only once and then be discharged to the final clarifier. But this is not objectionable, as the raw sewage entering the second filter is diluted with a larger quantity of effluent from the first filter which is rich in active bacterial growth and which, as stated above, is partly on its second pass through both filters.

It is one of the advantages of my system that each of the two filters is continuously seeded with fresh active bacteria from the other, so that the bacterial population of both filters is constantly maintained active. Also by this continuous exchange of bacterial growth between the filters, the type of bacteria on both will become substantially uniform, so that each filter is enabled to do the same amount and kind of work as the other. The raw sewage in my system, is acted upon by a much greater quantity of active bacteria which are in a better condition than when all settled raw sewage is treated first on the primary filter and only filtered sewage treated on the secondary filter.

The system of Figure 2 is essentially the same as that of Figure 1 with the one exception that in this case the recirculated portion of the secondary filter effluent is not brought back directly to the first filter but is discharged into the primary clarifier as through conduit 21a. In general this is less desirable, as most of the active bacterial growth contained in the filter effluent will settle out in the clarifier and will thus not be available for seeding the filter. However, in some cases, as where heavy slugs of bacterial slime are discharged from the second filter, it may be of advantage to settle these out prior to applying the recirculated effluent to the first filter. It will also be noted that in this case only a portion of the recirculated effluent from the second filter will go to the first filter, while the other will return to the second filter along with its portion of raw sewage. In this system, therefore, a greater proportion of the final effluent will have been treated only on the second filter, which is less desirable.

Consideration of Figure 3 shows that this system in its essential features is the same as that of Figure 1. Here, however, all of the secondary filter effluent is discharged into the final clarifier and the sewage which is recirculated is taken from the final clarifier, preferably from some intermediate portion thereof. As shown, the recirculated sewage may be returned directly to the first filter through conduit 21b and 21c similarly to the system described in connection with Figure 1, or first be sent to the primary clarifier through conduits 21b and 21d, smilarly to the system of Figure 2. This system is less desirable than the preferred system of Figure 1, as part of the active bacterial growth contained in the effluent of the second filter will settle out and can thus not be brought back on the first filter for seeding. Also, the material taken from such a clarifier is likely to be somewhat stale and what bacterial population it contains will not be in active condition.

It will be seen that by changing the manner of operation of two stage trickling filter plants I secure highly improved results. A special advantage of my system is that it can be incorporated, and its results obtained in, a conventional two stage trickling filter plant by making relatively small structural changes involving only little expense.

It will be understood that the figures show simplified and diagrammatic flow sheets from which all conventional parts which are not essential to the understanding of my system have been omitted. The combination of such parts, as for instance the clarifier underflow, or the conventional recirculation from outlet to inlet of the same filter, with my flow system, is to be construed as within the scope of the invention.

I claim:

1. A sewage treating system comprising a raw sewage inlet, a first trickling filter and a second trickling filter, conduit means connecting said raw sewage inlet and said first and second filters in the sequence recited, conduit means for delivering raw sewage from said raw sewage inlet to said second filter, an outlet to waste from said second filter only, and conduit means leading from the outlet of said second filter and discharging to said first filter.

2. A sewage treating system comprising a primary clarifier, a first biological filter, a second biological filter, and a final clarifier, piping connecting said clarifiers and filters in the sequence cited, a raw sewage inlet into the primary clarifier, and a treated sewage outlet from the secondary clarifier, characterized by conduit means for conveying a portion of the raw sewage coming from the primary clarifier to the second filter, and conduit means for returning a portion of the effluent from the second filter to said system upstream of the first filter.

3. In a system for treating sewage by two stage filtration comprising a clarifier, a first trickling filter and a second trickling filter, means for continuously passing a portion of raw sewage from the clarifier to said first filter for a first treatment therein and another portion to said second filter for a first treatment therein, means for passing the unsedimented effluent of said first filter to said second filter for further treatment therein along with the raw sewage receiving its first treatment on said second filter, and means for returning a portion of the sewage treated on the second filter to the system upstream of the first filter for further treatment on said first filter along with the raw sewage receiving its first treatment thereon, and means leading from said second filter for discharging the effluent of said system to waste.

4. In a sewage treating plant comprising a first clarifier having a raw sewage inlet and a clarified raw sewage outlet, a first biological filter, a second biological filter, and a second clarifier having an inlet and an outlet to waste, an inlet for clarified raw sewage into each of said filters, said clarified raw sewage inlets being connected to said outlet from said first clarifier, an outlet from each of said filters, the outlet from the first filter being connected to said inlet to the second filter, and the outlet of said second filter being connected to the inlet of said second clarifier and to the inlet of said first filter.

5. In the biological filtration of sewage, a method of equalizing the organic load and the bacterial population on a first and a second trickling filter arranged in sequence which comprises dosing each filter with a substantial portion of the incoming sewage to be treated, seeding the secondary filter with fresh bacterial from the first filter by dosing it additionally with the unsedimented effluent of the first filter, seeding the first filter with fresh bacteria from the second filter by dosing it additionally with an unsedimented portion of the effluent of the second filter, and withdrawing the balance of the effluent of the second filter.

6. In a sewage treating plant comprising a raw sewage inlet, a first biological filter, and a second biological filter, conduit means connecting said raw sewage inlet to each of said filters, means including a conduit for passing unsedimented effluent of said first filter over said second filter, means including a conduit for passing a portion of the effluent of said second filter over said first filter, and means for withdrawing the balance of the effluent of said second filter to waste.

JOHANNA GUNZ.

REFERENCES CITED

The following references are of record in the file of this patent:

UNITED STATES PATENTS

| Number | Name | Date |
|---|---|---|
| Re. 22,144 | Ward | July 21, 1942 |
| 2,142,196 | Landon | Jan. 3, 1939 |
| 2,168,208 | Jenks | Aug. 1, 1939 |
| 2,355,760 | Trebler | Aug. 15, 1944 |

OTHER REFERENCES

Keifer: Sewage-Treatment Works (1940), pp. 266–268.

Water Works and Sewerage (October 1942), pp. 416–422.

Industrial and Engineering Chemistry, vol. 39 (1947), pp. 573–574.